(12) United States Patent
Theriault

(10) Patent No.: US 8,430,578 B1
(45) Date of Patent: Apr. 30, 2013

(54) SEPARATION OF MAIN AND SECONDARY INERTIAL MEASUREMENTS FOR IMPROVED LINE OF SIGHT ERROR OF AN IMAGING VEHICLE'S ISOLATED DETECTOR ASSEMBLY

(75) Inventor: Philip C. Theriault, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 13/300,058

(22) Filed: Nov. 18, 2011

(51) Int. Cl.
*G03B 17/00* (2006.01)
*G01C 1/00* (2006.01)
*G01C 19/38* (2006.01)
*G01C 1/02* (2006.01)

(52) U.S. Cl.
USPC .......................... 396/427; 33/275 G; 33/299

(58) Field of Classification Search .................. 396/427; 33/275 G, 266, 292, 299
See application file for complete search history.

(56) References Cited

U.S. PATENT DOCUMENTS

| | | | | |
|---|---|---|---|---|
| 5,894,323 | A * | 4/1999 | Kain et al. ..................... | 348/116 |
| 8,022,991 | B1 * | 9/2011 | Kancler et al. ................ | 348/193 |
| 8,326,532 | B2 * | 12/2012 | Kmiecik et al. .............. | 701/472 |
| 2009/0216451 | A1 * | 8/2009 | Barnes et al. ..................... | 702/5 |

OTHER PUBLICATIONS

Hablani, Hari B. "Endgame Guidance and Relative Navigation of Strategic Interceptors with Delays," The Boeing Company, Huntington Beach, California 92803, Journal of Guidance, Control, and Dynamics vol. 29, No. 1, Jan.-Feb. 2006, pp. 82-94.

Waegli et al., "Noise reduction and estimation in multiple microelectro-mechanical inertial systems," IOP Publishing, Measurement Science and Technology, 21 (2010), 065201, published Apr. 21, 2010, pp. 1-12.

Osman et al.. "Multi-Sensor Inertial Navigation Systems Employing Skewed Redundant Inertial Sensors." ION GNSS 19th International Technical Meeting of the Satellite Division, Sep. 26-29, 2006, Fort Worth, TX., pp. 2202-2207.

Ryan Hanson, "Using Multiple MEMS IMUs to form a Distributed Inertial Measurement Unit," AFIT/GE/ENG/05-06, Department of the Air Force, Air University, Air Force Institute of Technology, Wright-Patterson Air Force Base, Ohio, Mar. 2005, pp. 1-106.

Jared B. Bancroft, "Multiple IMU Integration for Vehicular Navigation," ION GNSS 2009. Session D2. Savannah, GA, Sep. 22-25, 2009, pp. 1-13.

\* cited by examiner

*Primary Examiner* — Clayton E Laballe
*Assistant Examiner* — Noam Reisner
(74) *Attorney, Agent, or Firm* — Eric A. Gifford

(57) ABSTRACT

The 6-axis position and attitude of an imaging vehicle's detector assembly is measured by mounting the detector assembly on a compliant isolator and separating the main 6-axis IMU on the vehicle from secondary inertial rate sensors on the detector assembly. The compliant isolator couples low-frequency rigid body motion of the vehicle below a resonant frequency to the isolated detector assembly while isolating the detector assembly from high-frequency attitude noise above the resonant frequency. The secondary inertial rate sensors measure the angular rate of change in yaw and pitch of the isolated detector assembly. A computer processes measurements of the 6-axis rigid body motion and the angular rate of change in yaw and pitch of the isolated detector assembly to estimate the 6-axis position and attitude of the detector assembly.

17 Claims, 4 Drawing Sheets

SEPARATION OF MAIN AND SECONDARY INERTIAL MEASUREMENTS FOR IMPROVED LINE OF SIGHT ERROR OF AN IMAGING VEHICLE'S ISOLATED DETECTOR ASSEMBLY

BACKGROUND OF THE INVENTION

1. Field of the Invention

This invention relates to imaging vehicles that are provided with a detector assembly for imaging a scene, and more particularly to the measurement of a 6-axis position and attitude of the imaging vehicle and its detector assembly to improve line-of-sight (LOS) error.

2. Description of the Related Art

An imaging vehicle provides a platform on which a detector assembly is mounted. The vehicle, which includes a propulsion system, may, for example, be a spacecraft, a manned aircraft, an unmanned aerial vehicle (UAV), a missile interceptor, a kinetic energy kill vehicle (KV) interceptor, a land-based vehicle or a ship. The detector assembly includes a telescope (e.g. an optical mirror and/or lens assembly) and one or more detectors that capture images of a scene in the infrared (IR), visible or millimeter wave (MMW) bands of the electromagnetic spectrum. The detector assembly may be single-band or multi-band.

A 6-axis tactical grade or strategic grade Inertial Measurement Unit (IMU) mounted on the vehicle frame provides measurements of both the linear acceleration and angular rate which is processed to give position and attitude of the vehicle. The IMU typically comprises a ring laser gyro, fiber gyro or hemispheric resonator gyro that exhibit good drift performance over a period of time appropriate to the mission duration. Mechanical isolation is commonly used to mechanically low-pass filter the vibrations and body motion observed by the main IMU. Generally the inertial instrument block (gyroscopes and accelerometers) is center of gravity mounted with mechanical isolators within an outer case; the net structure is then termed the IMU. The IMU measures linear acceleration along the orthogonal x, y and z axes and rate of change of angle (roll, pitch and yaw) about those axis to determine the 6-axis position and attitude of the seeker for guidance, navigation and control (GNC) maneuvers. A line extending from the center of the optical system out a great distance to an object in the center of the field of view (FOV) may also be referred to as the line-of-sight (LOS).

SUMMARY OF THE INVENTION

The following is a summary of the invention in order to provide a basic understanding of some aspects of the invention. This summary is not intended to identify key or critical elements of the invention or to delineate the scope of the invention. Its sole purpose is to present some concepts of the invention in a simplified form as a prelude to the more detailed description and the defining claims that are presented later.

The present invention provides an imaging vehicle architecture that partially isolates the detector assembly from the vehicle frame and separates the main 6-axis inertial measurement of the vehicle frame from a secondary inertial rate measurement of the detector assembly to account for relative movement between the detector assembly and vehicle frame in order to provide a more benign shock and vibration environment for the detector assembly and to improve the LOS measurement error of the detector assembly.

In an embodiment, this is accomplished by mounting the detector assembly on a compliant isolator on the vehicle frame. The compliant isolator partially isolates the detector assembly from attitude noise of the rigid body motion of the vehicle frame. A main IMU measures the 6-axis rigid body motion of the vehicle frame. At least two rate sensors measure at least the angular rate of change in pitch and yaw of the detector assembly. A computer processes the measurements of 6-axis rigid body motion and angular rate of change in pitch and yaw of the detector assembly to estimate a 6-axis position and attitude of the isolated detector assembly, hence LOS variation relative to the vehicle.

The vehicle is subjected to mechanical perturbations from environmental conditions or its own propulsion system that produce attitude noise. The compliant isolator isolates the detector assembly from the high-frequency attitude noise while coupling the low-frequency rigid body motion of the vehicle frame to the detector assembly. In an embodiment, the compliant isolator and detector assembly exhibit a resonant frequency between 5 Hz and 5 kHz for yaw and pitch. In another embodiment, the compliant isolator has a resonant frequency between 100 Hz and 500 Hz for yaw and pitch. In another embodiment, the system has a resonant frequency between 200 Hz and 300 Hz for yaw and pitch. In general, the isolator attenuates attitude noise above the resonant frequency.

In an embodiment, the detector assembly includes an isolated sub-assembly comprising imaging components of a telescope and a detector mounted on the compliant isolator. The at least two rate sensors are mounted on the detector assembly to measure the angular rate of change in yaw and pitch of the isolated sub-assembly. The sensors may be mounted on the telescope structure that mounts the optical components and positions them relative to each other, telescope structure that supports the isolated sub-assembly or on the optical components themselves. In another embodiment, the detector assembly further includes a non-isolated sub-assembly comprising non-imaging components such as a cryogenic cooling system, a sunshade and a mechanical structure that supports the cooling system and sunshade, and the computer that are rigidly mounted to the vehicle frame. In another embodiment, the isolated sub-assembly is configured with only a minimal set of imaging components required to image the scene in order to reduce the isolated mass. All non-imaging components are part of the non-isolated sub-assembly.

In an embodiment, the at least two rate sensors measure only the angular rate of change in yaw and pitch of the isolated detector assembly. The at least two rate sensors may comprise an individual gyroscope, piezoelectric angle rate sensors, MEMS angle rate sensors, magnetohydrodynamic angular rate sensors, or a 6-axis IMU, possibly a MEMS-based IMU, in which only the pitch and yaw sensors are utilized.

In an embodiment, the compliant isolator attenuates attitude noise in roll as well and at least three sensors measure the angular rate of change in yaw, pitch and roll of the isolated detector assembly.

In an embodiment, the main IMU is of tactical or strategic grade exhibiting a specified drift performance over an extended time period. The at least two rate sensors exhibit the specified drift performance over a shortened time period e.g. at least one order of magnitude difference.

In an embodiment, the vehicle is one of a spacecraft, a manned aircraft, an unmanned aerial vehicle (UAV), a missile interceptor, a kinetic energy kill vehicle (KV) interceptor, a land-based vehicle or a ship.

In an embodiment, the detector assembly comprises one or more detectors that capture images of a scene in the IR, visible or MMW bands of the electromagnetic spectrum. The detector assembly may be single-band or multi-band.

These and other features and advantages of the invention will be apparent to those skilled in the art from the following detailed description of preferred embodiments, taken together with the accompanying drawings, in which:

DETAILED DESCRIPTION OF THE INVENTION

The present invention provides an imaging vehicle architecture and method of measuring 6-axis position and attitude of the vehicle's detector assembly. The detector assembly, or at least an isolated sub-assembly comprising the imaging components of the telescope and detector, is mounted on a compliant isolator. The compliant isolator and detector assembly mass together exhibit a system resonant frequency. The compliant isolator couples low-frequency rigid body motion of the vehicle below the system's resonant frequency to the isolated sub-assembly while isolating the sub-assembly from high-frequency attitude noise above the resonant frequency to provide a benign shock and vibration environment for capturing images of the scene. The main 6-axis IMU on the vehicle frame is separated from secondary inertial sensors on the isolated sub-assembly. The secondary inertial rate sensors measure at least the angular rate of change in yaw and pitch of the isolated sub-assembly. The measurements of the 6-axis rigid body motions and the angular rate of change in yaw and pitch of the isolated detector assembly are used by the guidance, navigation and control (GNC) software to estimate the accurate position of the imaged scene relative to the vehicle in order to calculate what actions to take.

As used herein, an imaging vehicle is any type of vehicle provided with a propulsion system and a detector assembly for capturing images of a scene. The imaging vehicle may, for example, be spacecraft, a manned aircraft, an unmanned aerial vehicle (UAV), a missile interceptor, a kinetic energy kill vehicle (KV) interceptor, a land-based vehicle or sea-based vehicle. The detector assembly comprises at least a telescope for capturing electromagnetic energy and a detector for imaging the captured electromagnetic energy. The telescope and detector may operate in the IR, visible or MMW bands and may be configured as single-band or multi-band devices.

Figure 1:
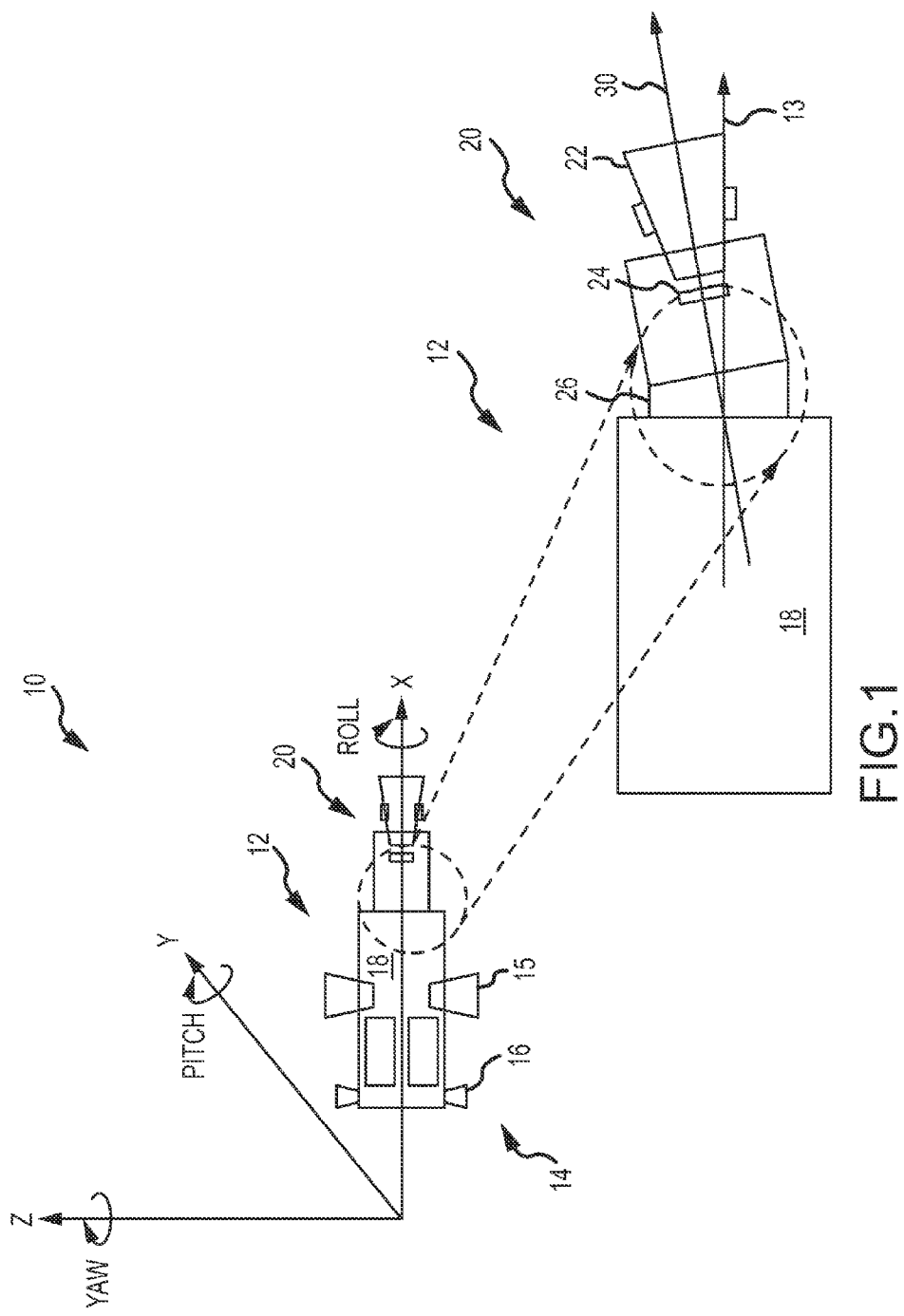
FIG. 1 is a diagram of an imaging vehicle having an isolated detector assembly positioned within a coordinate system to roll about the x-axis and pitch and yaw about and y-axis and z-axis, respectively, with a LOS error between the vehicle and detector assembly in yaw and pitch.
Figure 2:
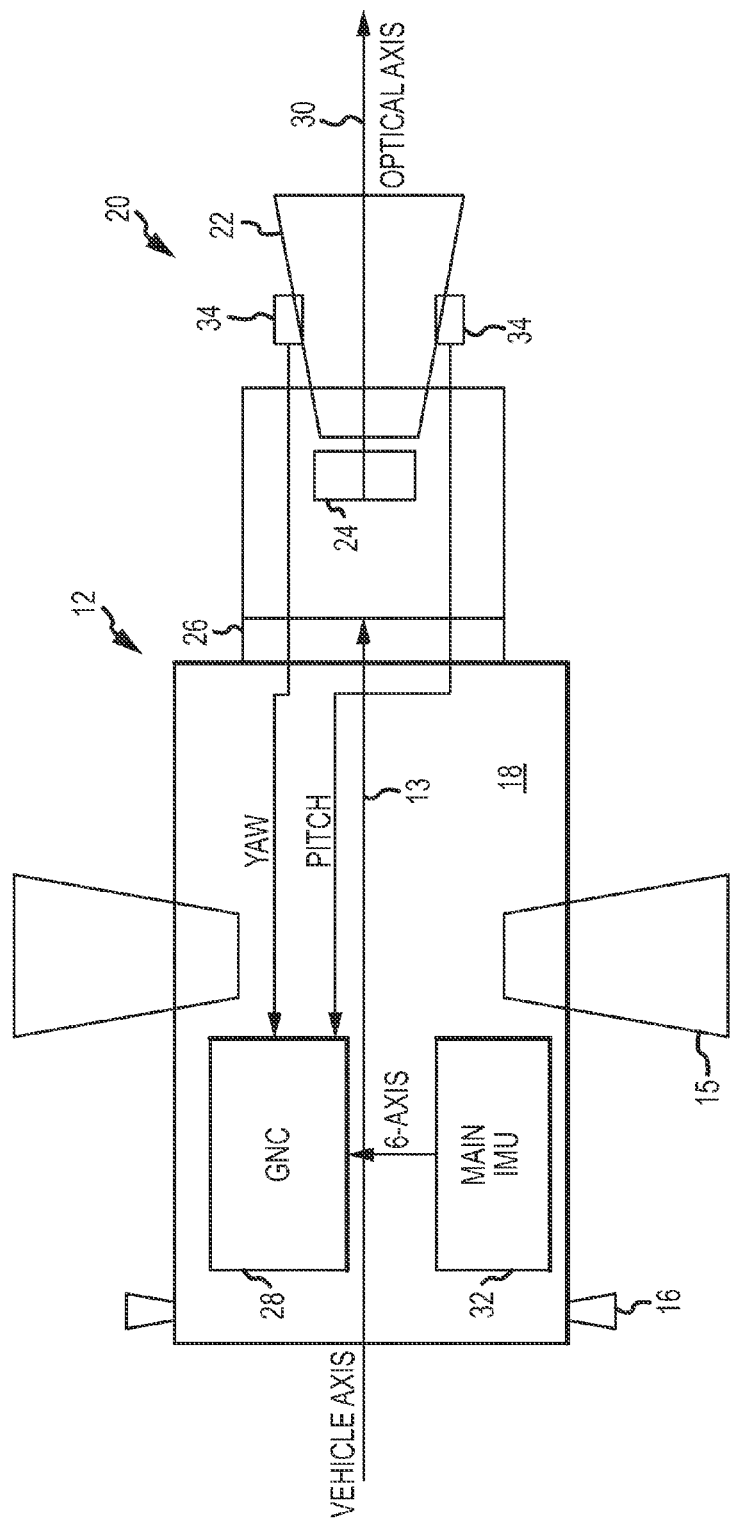
FIG. 2 is a block diagram of an embodiment of an imaging vehicle in which a main guidance IMU measures the 6-axis rigid body motion of the imaging vehicle and at least two rate sensors measure the angular rate of change in yaw and pitch of the isolated seeker.
Figure 3:
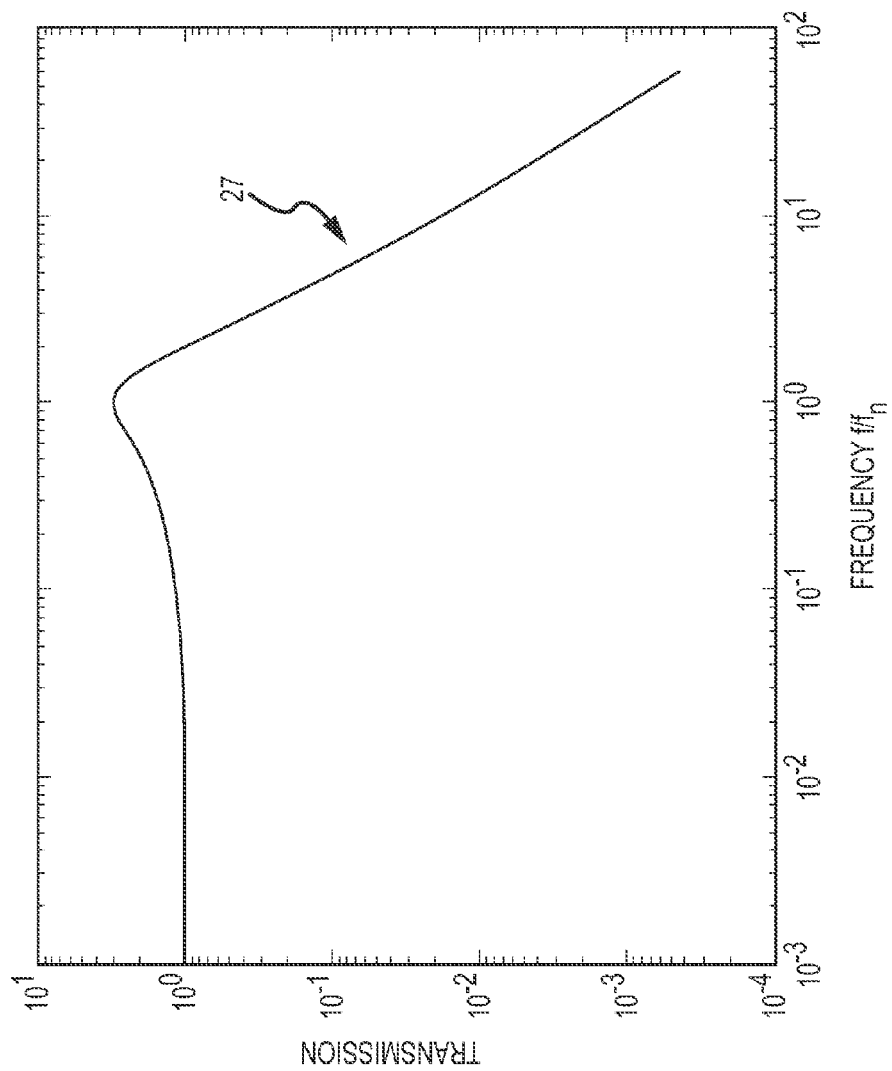
FIG. 3 is a plot of gain vs. normalized frequency illustrating the resonance properties of the isolator that transfer rigid body motion at low frequencies while attenuating high-frequency attitude noise.

Referring now to FIGS. 1, 2 and 3, a coordinate system 10 is defined by orthogonal x, y and z-axes. Rotation about the x-axis is roll, about the y-axis is pitch and about the z-axis is yaw. An imaging vehicle 12 is positioned in coordinate system 10 with its frame axis 13 coincident with the x-axis. Imaging vehicle 12 includes a propulsion system 14 such as provided by divert thrusters 15 and attitude control thrusters 16 mounted on a frame 18. Different vehicles will have different types of propulsion systems. Imaging vehicle 12 includes a detector assembly 20 comprising a telescope 22 for capturing EM radiation of a scene and at least one detector 24 for sensing the captured EM radiation to produce a sequence of images. Telescope 22 may include one or more mirrors and/or one or more lenses for capturing and focusing a desired band of EM radiation onto one or more detectors in the IR, visible or MMW bands.

During flight, the imaging vehicle experiences forces that cause it to accelerate either linearly or rotationally, referred to as "rigid body motion". For example, firing the thrusters or wind may induce rigid body motion. For GNC it is important to accurately measure rigid body motion to estimate the 6-axis position and attitude of the imaging vehicle.

Rigid body motion may be represented as having two components. A lower frequency component tracks the general movement of the imaging vehicle. A higher frequency component represents noise such as due to shock or vibration. Noise may be positional noise that accelerates the interceptor in x, y or z or attitude noise in the angular rate of change in roll, pitch or yaw.

To provide a more benign environment for capturing images of the scene, the detector assembly 20 is mounted on a compliant isolator 26 attached to frame 18. The mass of the detector assembly 20 (or at least the isolated components thereof) and compliant isolator 26 define a system that exhibits a resonant frequency. The mass of the imaging vehicle is assumed to be much larger than the isolated mass; hence its effect on the resonant system is negligible. Rigid body motion at frequencies below the resonant frequency is coupled to the detector assembly 20 so that the assembly tracks the general movement of the imaging vehicle. In some embodiments, attitude noise in pitch and yaw at frequencies above the resonant frequency is at least partially attenuated to detector assembly 20 to isolate the assembly from various sources of noise. In other embodiments, attitude noise in roll above a resonant frequency may also be attenuated. In other embodiments, position noise above a resonant frequency may also be attenuated. Compliant isolator 26 may be designed to exhibit different resonant frequencies to different components of rigid body motion.

FIG. 3 plots the transmission 27 of the rigid body motion through the compliant isolator to the isolated mass of the detector assembly against normalized frequency i.e. the ratio of actual frequency f to the resonant frequency $f_n$. As shown, at frequencies below the resonant frequency, the transmission is approximately one; hence the rigid body motion is coupled to the detector assembly. At frequencies above the resonant frequency (e.g. noise), the transmission is less than one and the noise is attenuated. Generally speaking, the higher the frequency of the noise the greater the attenuation. Furthermore, for an isolator of a given compliance the higher the isolated mass the lower the resonant frequency and the greater the isolation, stated inversely, for a constant isolated mass, the greater the compliance of the isolator, the lower the resonant frequency. At or near resonance, the rigid body motion may actually be amplified to some extent. Sources of damping may be introduced into the system to limit this amplification. Additionally, the system is suitably designed so that the resonant frequency of the system is not near the excitation frequencies of the propulsion system.

In an embodiment, the compliant isolator has a resonant frequency between 5 Hz and 5 kHz. In another embodiment, the compliant isolator has a resonant frequency between 100 Hz and 500 Hz. In another embodiment, the compliant isolator has a resonant frequency between 200 Hz and 300 Hz.

In an embodiment of imaging vehicle 12, compliant isolator 26 isolates the detector assembly 20 from attitude noise in pitch and yaw to provide a more benign environment for capturing images of the scene. The compliant isolator may be symmetric and exhibit the same or approximately the same resonant frequencies in yaw and pitch. Furthermore, the interceptor's GNC is relatively very insensitive to detector assembly position noise in x, y and z. In other embodiments, the compliant isolator may be configured to attenuate roll noise as well and/or position noise.

Isolation of the detector assembly from the imaging vehicle frame provides a more benign environment for capturing images of the scene but induces LOS errors in pitch and yaw between the detector assembly and the frame as shown by divergence of the detector assembly axis 30 from frame axis 13 in FIG. 1. To reconcile the LOS errors and provide an accurate measurement of the imaging vehicle's 6-axis position and attitude and the detector assembly's pitch and yaw divergence from that vehicle's axis, a main 6-axis IMU 32 is coupled to measure the 6-axis rigid body motion of the vehicle's frame 18 including linear accelerations in x, y and z directions and angular rates of change of roll, pitch and yaw about the respective x, y and z axes. At least two secondary sensors 34 are coupled to measure the angular rate of change in yaw and pitch of the isolated detector assembly 20. A GNC computer 28 processes measurements of the 6-axis rigid body motion and measurements of the angular rate of change in yaw and pitch of the isolated sub-assembly to estimate a 6-axis position in x, y and z and attitude in roll, pitch and yaw of the isolated detector assembly.

In some embodiments, detector assembly 20 includes an isolated sub-assembly comprising imaging components of telescope 22 (e.g. a telescope structure, one or more lenses and/or one or more mirrors) and detector 24 mounted on the compliant isolator 26. The at least two sensors 34 are coupled to measure the angular rate of change in yaw and pitch of the isolated sub-assembly. The sensors may be mounted on the telescope structure that mounts the optical components and positions them relative to each other, telescope structure that supports the isolated sub-assembly or components of the telescope itself. In another embodiment, the detector assembly further includes a non-isolated sub-assembly comprising non-imaging components such as a cryogenic cooling system for the detector, a sunshade and a mechanical structure that supports the cooling system and sunshade, and the computer that are rigidly mounted to the vehicle frame. In another embodiment, the isolated sub-assembly is configured with only a minimal set of imaging components required to image the scene in order to reduce or minimize the isolated mass. All non-imaging components are part of the non-isolated sub-assembly. In another embodiment, the isolated sub-assembly may include one or more of the non-imaging components.

In some embodiments, the at least two rate sensors measure only the angular rate of change in yaw and pitch of the isolated detector assembly. The at least two rate sensors may comprise an individual gyroscope, piezoelectric angle rate sensors, MEMS angle rate sensors, magnetohydrodynamic angular rate sensors, or a 6-axis IMU, possibly a MEMS-based IMU, in which only the pitch and yaw sensors are utilized.

In some embodiments, the compliant isolator attenuates attitude noise in roll as well and at least three sensors measure the angular rate of change in yaw, pitch and roll of the isolated detector assembly. In some embodiments, the compliant isolator attenuates position noise.

In some embodiments, the main IMU is of tactical or strategic grade exhibiting a specified drift performance over an extended time period. The main IMU typically comprises a ring laser gyro, fiber gyro or hemispheric resonator gyro that exhibit good drift performance over a period of time appropriate to the mission duration. The at least two rate sensors exhibit the specified drift performance over a shortened time period e.g. at least one order of magnitude (i.e. 10×) difference. The at least two rate sensors are generally lighter weight and less expensive than the tactical or strategic grade main IMU. Less weight lowers the isolated mass and the volume required for the assembly.

Figure 4:
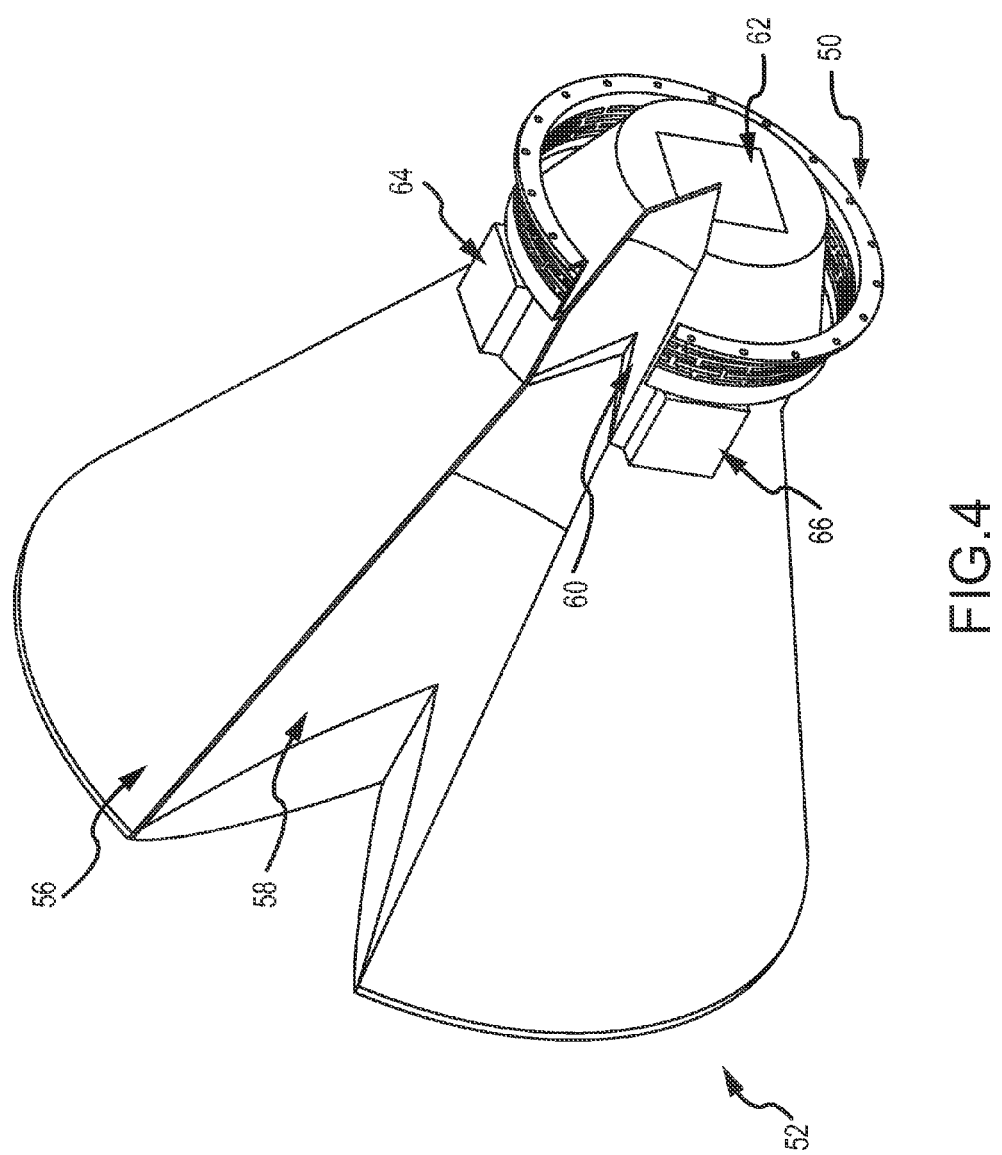
FIG. 4 is a section view of an embodiment of a vehicle's imaging system including the compliant isolator and a pair of rate sensors that measure the angular rate of change in yaw and pitch.

FIG. 4 illustrates an embodiment of a compliant isolator 50 for mechanical coupling to the frame of an imaging vehicle and an isolated imaging sub-assembly 52 of a detector assembly mounted thereon. Compliant isolator 50 comprises a metal ring that has been machined in a pattern such as to reduce its stiffness, hence lower the system resonant frequency in both yaw and pitch to between 5 Hz and 5 kHz. In this embodiment, the metal ring retains its relatively greater stiffness in roll and the x, y and z directions. Consequently, isolator 50 attenuates attitude noise in both pitch and yaw above the resonant frequency. Other embodiments of the compliant isolator may comprise coil springs, torsion springs, metal flexures, rubber mounts, wire rope mounts or bearings to name a few.

Imaging sub-assembly 52 comprises a telescope structure 56, primary and secondary lenses 58 and 60, respectively, and a detector 62. The primary or secondary lenses may be simple or compound lenses. The primary lens 58 gathers EM radiation and in combination with the second lens 60 focuses an image of the scene in front of the telescope onto the detector 62. In this particular embodiment, the imaging sub-assembly comprises only a minimum configuration of imaging elements i.e. a telescope structure, lens/mirror components and a detector to minimize the isolated mass. The compliant isolator is the only mechanical connection between the imaging sub-assembly 52 and the imaging vehicle frame. Other electrical connections and coolant lines may be connected from the interceptor to the detector.

A pair of angle rate sensors 64 and 66 are mounted on telescope structure 56 90 degrees apart so that one sensor measures angular rate of change in yaw and the other sensor measures angular rate of change in pitch. Other configurations of angle sensors are envisioned to measure the angular rates of change in yaw and pitch. In some embodiments, the angle rate sensors each comprise a gyroscopic angular rate sensor or a MEMS angular rate sensors or together comprise a 6-axis MEMS IMU of which only the yaw and pitch sensors are utilized. For example, the angle rate sensor may comprise an Analog Devices ADXRS453 or ADIS16130 Angular Rate Sensor or an ATA ARS-15 Angular Rate Sensor.

While several illustrative embodiments of the invention have been shown and described, numerous variations and alternate embodiments will occur to those skilled in the art. Such variations and alternate embodiments are contemplated, and can be made without departing from the spirit and scope of the invention as defined in the appended claims.

I claim:

1. An imaging vehicle, comprising:
    a frame;
    a propulsion system mounted to the frame;
    a main IMU coupled to measure 6-axis rigid body motion of the vehicle's frame, said 6-axis rigid body motion including linear accelerations in x, y and z directions and angular rates of change of roll, pitch and yaw about the respective x, y and z axes;
    a compliant isolator mounted to the frame;
    a detector assembly for capturing images of scene, said assembly including an isolated sub-assembly comprising a telescope and a detector mounted on said compliant isolator, said isolator and isolated sub-assembly having a resonant frequency between 5 Hz and 5 kHz to partially isolate said sub-assembly from attitude noise of the rigid body motion of the frame;
    at least two secondary rate sensors coupled to measure the angular rate of change in yaw and pitch of the isolated sub-assembly; and
    a computer that processes measurements of the 6-axis rigid body motion and measurements of the angular rate of change in yaw and pitch of the isolated sub-assembly to estimate a 6-axis position in x, y and z and attitude in roll, pitch and yaw of the isolated sub-assembly.

2. The imaging vehicle of claim 1, wherein said compliant isolator couples low-frequency rigid body motion of the vehicle frame below the resonant frequency to the detector assembly and isolates the sub-assembly from high-frequency attitude noise above the resonant frequency.

3. The imaging vehicle of claim 2, wherein the resonant frequency is between 100 Hz and 500 Hz for yaw and pitch.

4. The imaging vehicle of claim 2, wherein the resonant frequency is between 200 Hz and 300 Hz for yaw and pitch.

5. The imaging vehicle of claim 1, wherein said isolated sub-assembly comprises only the imaging components of said telescope and said detector.

6. The imaging vehicle of claim 5, wherein said detector assembly also includes a non-isolated sub-assembly comprising one or more non-imaging components, said isolated sub-assembly configured to minimize the isolated mass.

7. The imaging vehicle of claim 1, wherein said at least two secondary rate sensors are mounted on the telescope.

8. The imaging vehicle of claim 1, wherein said at least two secondary rate sensors exhibit a specified drift performance over a first time period, said main IMU exhibiting a specified drift performance over a second time period, said second time period being at least 10 times longer than said first time period.

9. The imaging vehicle of claim 8, wherein main IMU comprises a ring laser gyroscope, a fiber gyroscope or a hemispheric resonator gyroscope that provide 6-axis measurements and said at least two secondary rate sensors each comprise a gyroscopic angular rate sensor or a MEMS angular rate sensors or together comprise a 6-axis MEMS IMU of which only the yaw and pitch sensors are utilized.

10. A kinetic energy kill vehicle (KV), comprising:
    a frame;
    divert and attitude control thrusters mounted to the frame to alter the trajectory of the KV;
    a main IMU coupled to measure 6-axis rigid body motion of the KV, said 6-axis rigid body motion including linear accelerations in x, y and z directions and angular rates of change of roll, pitch and yaw about the respective x, y and z axes;
    a compliant isolator mounted to the frame;
    a seeker for capturing images of scene, said seeker including an isolated sub-assembly comprising a telescope and a detector mounted on said compliant isolator, said compliant isolator and isolated sub-assembly having a resonant frequency between 5 Hz and 5 kHz for yaw and pitch, said isolator coupling low-frequency rigid body motion of the KV below the resonant frequency to the seeker and isolating the seeker's isolated sub-assembly from high-frequency attitude noise above the resonant frequency;
    at least two secondary rate sensors coupled to measure the angular rate of change in yaw and pitch of the isolated sub-assembly; and
    a computer that processes measurements of the 6-axis rigid body motion and measurements of the angular rate of change in yaw and pitch of the isolated sub-assembly to estimate a 6-axis position in x, y and z and attitude in roll, pitch and yaw of the isolated sub-assembly.

11. The KV of claim 10, wherein said detector assembly also includes a non-isolated sub-assembly comprising one or more non-imaging components, said isolated sub-assembly comprising only the imaging components of said telescope and said detector to minimize the isolated mass.

12. The KV of claim 10, wherein said at least two secondary rate sensors exhibit a specified drift performance over a first time period, said main IMU exhibiting a specified drift performance over a second time period, said second time period being at least 10 times longer than said first time period.

13. The KV of claim 12, wherein main IMU comprises a ring laser gyroscope, a fiber gyroscope or a hemispheric resonator gyroscope that provide 6-axis measurements and said at least two secondary rate sensors each comprise a gyroscopic angular rate sensor or a MEMS angular rate sensors or together comprise a 6-axis MEMS IMU of which only the yaw and pitch sensors are utilized.

14. A method of measuring 6-axis position and attitude of a detector assembly on an imaging vehicle, said vehicle comprising a propulsion system mounted to a frame and a main IMU coupled to measure 6-axis rigid body motion of the vehicle's frame, said 6-axis rigid body motion including linear accelerations in orthogonal x, y and z directions and angular rates of change of roll, pitch and yaw about the respective x, y and z axes, said detector assembly including an isolated sub-assembly comprising a telescope and a detector, said method comprising:
    mounting the isolated sub-assembly on a compliant isolator to provide a resonant frequency between 5 Hz and 5 kHz for yaw and pitch, said compliant isolator coupling low-frequency rigid body motion of the vehicle below the resonant frequency to the isolated sub-assembly and isolating the isolated sub-assembly from high-frequency attitude noise above the resonant frequency;
    measuring the angular rate of change in yaw and pitch of the isolated sub-assembly; and
    processing measurements of the 6-axis rigid body motion and measurements of the angular rate of change in yaw and pitch of the isolated sub-assembly to estimate the 6-axis position in x, y and z and attitude in roll, pitch and yaw of the detector assembly.

15. The method of claim 14, wherein the resonant frequency lies between 100 Hz and 500 Hz for yaw and pitch.

16. The method of claim 14, wherein said isolated sub-assembly comprises only the imaging components of said telescope and said detector to minimize the isolated mass.

17. The method of claim 14, wherein only the angular rate of change in yaw and pitch are measured for the isolated sub-assembly.

\* \* \* \* \*